Figure 1:
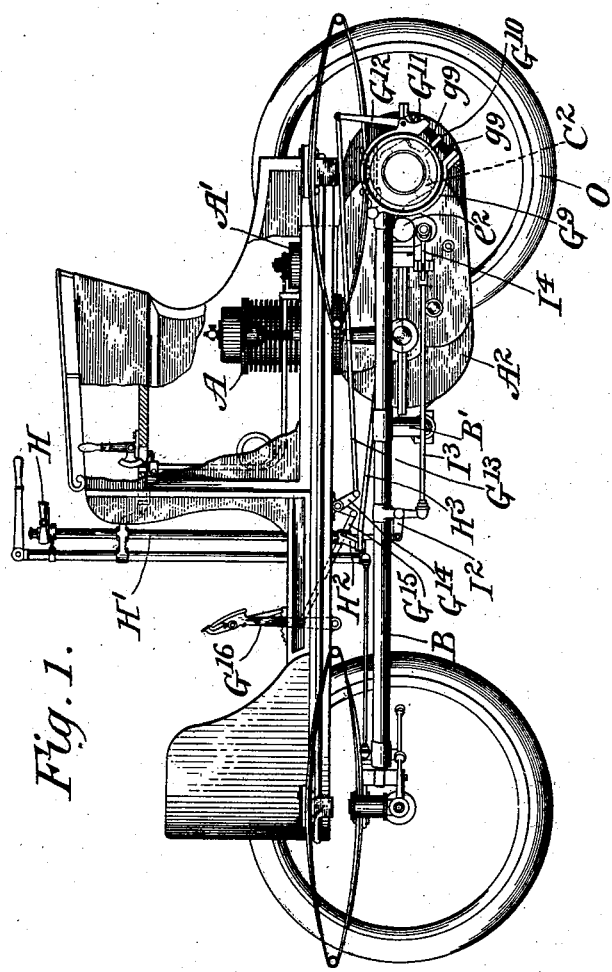

No. 739,924. PATENTED SEPT. 29, 1903.
H. M. POPE.
MOTOR VEHICLE.
APPLICATION FILED OCT. 26, 1899.
NO MODEL. 3 SHEETS—SHEET 1.

Attest:
R. H. Boardman.
A. N. Jesbera.

Inventor:
Harry M. Pope
by Redding, Kiddle & Greeley
Attys.

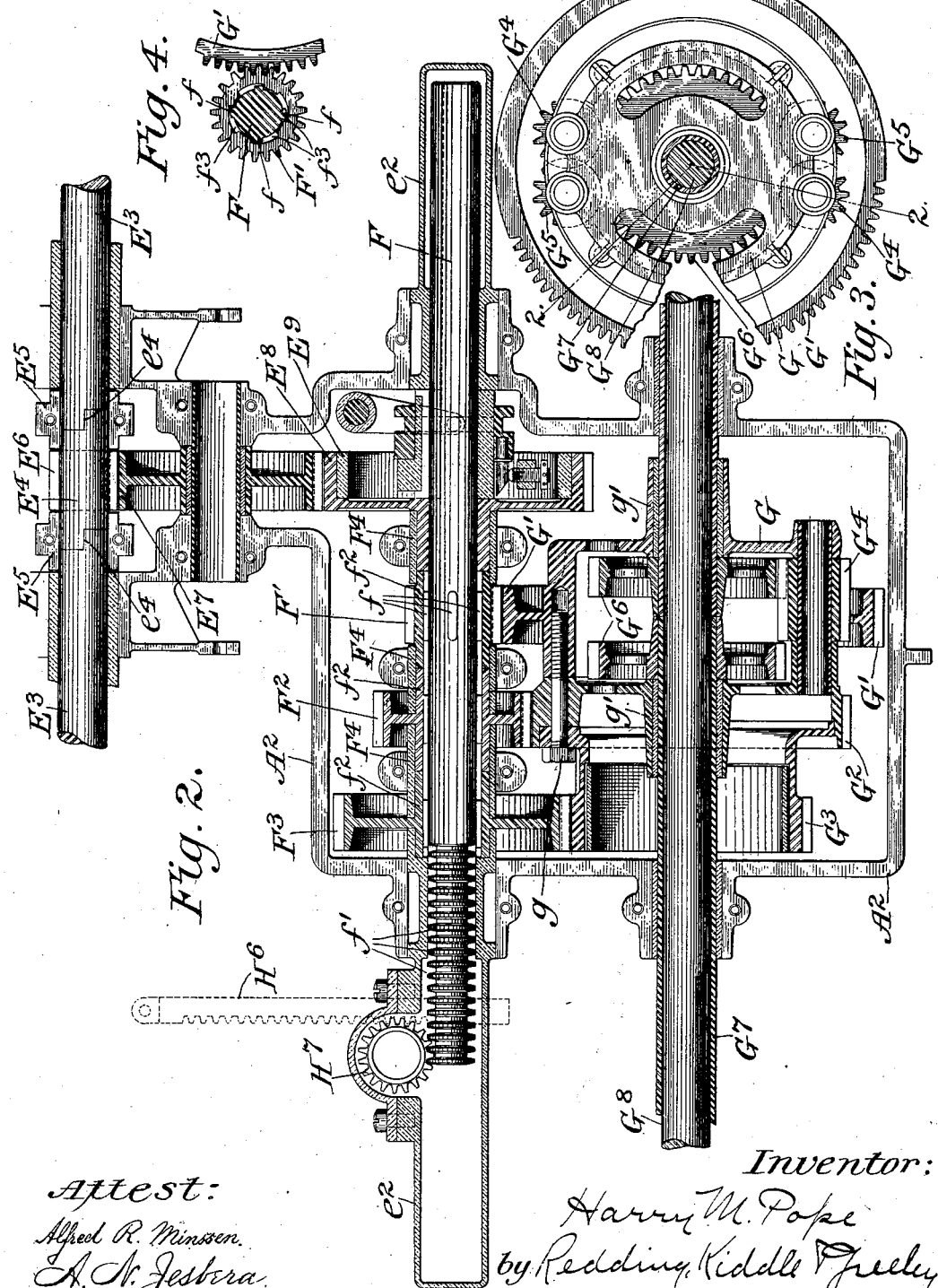

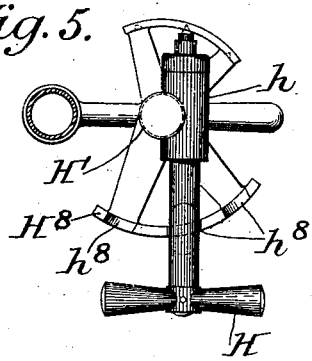
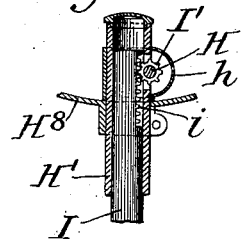
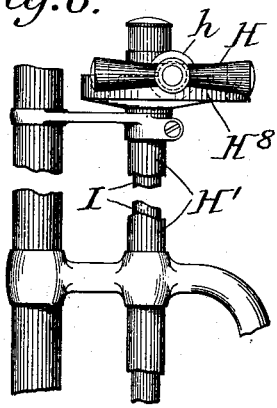
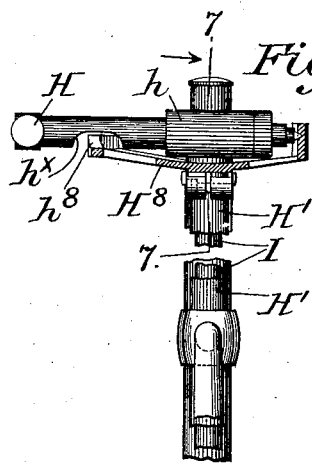

No. 739,924. Patented September 29, 1903.

UNITED STATES PATENT OFFICE.

HARRY M. POPE, OF HARTFORD, CONNECTICUT, ASSIGNOR, BY MESNE ASSIGNMENTS, TO MORTON TRUST COMPANY, TRUSTEE, A CORPORATION OF NEW YORK.

MOTOR-VEHICLE.

SPECIFICATION forming part of Letters Patent No. 739,924, dated September 29, 1903.

Application filed October 26, 1899. Serial No. 734,816. (No model.)

*To all whom it may concern:*

Be it known that I, HARRY M. POPE, a citizen of the United States, residing in the city of Hartford, county of Hartford, State of Connecticut, have invented certain new and useful Improvements in Motor-Vehicles, of which the following is a specification, reference being had to the accompanying drawings, forming a part hereof.

This invention relates particularly to the driving mechanism of motor-vehicles and to the controlling devices therefor. The power-transmitting mechanism is so constructed and so arranged with respect to the running-gear frame and the wheels as to provide for the support of the load in such a manner that it shall affect the driving mechanism as little as possible, simplicity of construction and ease in manufacture being also aimed at, while all parts are compactly arranged, so that they can be fully protected from dust and easily flooded with oil. The mechanism for changing the speed of the vehicle is also improved, so that excessive wear is avoided, the maintenance of proper gear distance between intermeshing gears being thereby assured, as well as ease in operation. The controlling devices are so arranged that their operation is not interfered with or affected by oscillations of the body with respect to the driving mechanism, and provision is made whereby the uncoupling of the motor from the wheels of the vehicle and the changing of the speed of the vehicle are effected by the movements of a single handle, the mechanism also being so arranged that the uncoupling of the motor must always be effected before a change in speed is brought about, thus preventing the breakage of gear-teeth and sudden changes of speed, which occasion discomfort to the occupants of the vehicle.

Other features of improvement will be more particularly referred to hereinafter, and all will be described and explained with reference to the accompanying drawings, in which the several improvements are illustrated as applied to a convenient form of vehicle, although it will be understood that they are capable of application, either singly or together, to vehicles of other forms.

In the drawings, Figure 1 is a view in side elevation, partly broken out, of a vehicle which embodies the invention, the rear wheels being omitted. Fig. 2 is a detail partly-sectional view of the driving mechanism, the plane of section of the lower portion of said figure being indicated by the line 2 2 of Fig. 3. Fig. 3 is a side elevation of the balance-gear looking from the right in Fig. 2. Fig. 4 is a detail section on the plane indicated by the line 4 4 of Fig. 2. Figs. 5, 6, 7, and 8 are detail views of the controlling mechanism mounted on the body of the vehicle, Fig. 7 being a vertical section on the plane indicated by the line 7 7 of Fig. 8.

In the drawings a single motor A is shown, the casing $A'$ of the motor and the gear-inclosing case $A^2$ being represented as secured together, virtually forming one rigid structure, which is supported at its forward end by a transverse bar $B'$ of the running-gear frame B and at its rear end by the driving axle and wheels, as hereinafter indicated. The shell or casing $A^2$ completely incloses all of the parts of the driving mechanism, including the change-gear and the clutch, and, as will more clearly appear hereinafter, has no openings except for the rear or driving axle, the connection to the change-gear-controlling devices, the connection to the brake-actuating devices, and, it may be, the driving-shaft. All parts of the driving mechanism are thus fully protected from dust and can be flooded with oil and kept clean.

The driving mechanism is shown particularly in Fig. 2 of the drawings. In said figure two motor-shafts are represented at $E^3$ $E^3$. For convenience in coupling the end of each shaft is cut or rabbeted transversely to half its diameter, and between the two shafts and in alinement therewith is an intermediate section $E^4$, which has its ends correspondingly cut or rabbeted to half its diameter to fit the corresponding ends of the motor-shaft $E^3$, as indicated at $e^4$. Clamps $E^5$ are secured about the joints thus formed, bringing all parts to center without difficulty and securing them firmly together. The driving-pinion $E^6$ is fast upon the intermediate shaft-section $E^4$, meshing with an intermediate gear $E^7$, which meshes in turn with a gear $E^8$, mounted loosely on the change-gear shaft F. The gear $E^8$ forms one member of a friction-clutch of ordinary construction. The other member is indicated at $E^9$, being splined on the shaft to rotate therewith, although free to move longitudinally thereon, thereby providing for the coupling and uncoupling of the motor with or from the driving mechanism and driving-wheels. The employment of a friction-clutch, as well understood, permits the driving parts to be brought to speed gradually, and the location of the clutch between the motor and the change-gear, presently to be described, prevents the breaking of gear-teeth when changes of speed are effected. The change-gear shaft F, intermediate between the longitudinally-immovable driving or motor shaft $E^3$ and driven shaft or sleeve $G^7$, is movable longitudinally to effect the engagement by means of splines or keys $f$ with one or another of the several driving-gears which are supported concentrically with the shaft. For convenience in effecting the longitudinal movement the shaft may be formed at its end with circumferential rack-teeth $f'$, which are engaged by a pinion to be referred to hereinafter. The several driving-gears $F'$, $F^2$, and $F^3$ are supported concentrically with the shaft F, but are not supported by the shaft, and in consequence of this freedom of the gears from the shaft there is no burring, cutting, and wearing of the parts in use, which would otherwise make the movement of the parts hard and would eventually render them useless. Each gear is provided with an extended hub $f^2$, the several hubs being supported in outside bearing-brackets $F^4$, which are secured to the casing $E^2$, each hub being formed integrally with teeth or keyways, as indicated at $f^3$ in Fig. 4, for engagement with the spline $f$ of the change-shaft F.

The driven gears $G'$, $G^2$, and $G^3$, which correspond and remain always in mesh with the gears $F'$, $F^2$, and $F^3$, respectively, are secured to or formed upon the driving member G of the balance-gear, which permits independence of movement of the two driving-wheels of the vehicle, as is well understood. All of the parts being rigidly supported by the casing $E^2$ and the running-gear and the parallelism of the axis of rotation being always maintained, the maintenance of the proper gear distance and the smooth running of the gears are always assured. The driving member G of the balance-gear is a frame or shell, which may be made in separate parts for convenience in manufacture, which parts may be secured together by bolts $g$, and is provided with two extended hub-bearings $g'$. Pinions $G^4$ and $G^5$, intermeshing, (see Fig. 3,) are carried by the driving member G and mesh, respectively, with two gears $G^6 G^6$, which are mounted concentrically with the said driving member, being secured each to the inner end of one of the sleeves $G^7$ or parts of the divided tubular axle or driven shaft, at the outer end of which is secured, preferably by the improved means described hereinafter, the corresponding driving-wheel D of the vehicle. A stiffening-bar $G^8$ runs through the two sleeves or divided tubular axle from wheel-center to wheel-center, and, as shown in Fig. 2, is the only member extending from side to side of the vehicle through the frame or running-gear-supporting bracket-bearings, and therefore alone carries the weight of the driving mechanism. It will be observed that the advantages of a practically solid axle are secured and that the parts are symmetrically arranged, with the balance-gear practically in the center.

A brake is shown in Fig. 1 as applied to the hub of one of the driving-wheels and as consisting of a two-part band $G^9$, anchored at one point and having its free ends repelled by springs $g^9$, which reacts against a fixed abutment $G^{10}$, interposed between the two free ends. A headed rod $G^{11}$ passes through the two free ends of the band and is connected to one arm of a bell-crank $G^{12}$, which is mounted on one of the free ends. The other arm of the bell-crank is connected by a rod $G^{13}$, a bell-crank $G^{14}$, and a link $G^{15}$ with the brake-lever $G^{16}$. The controlling devices, comprising in this instance means for coupling and uncoupling the motor and the driving mechanism and means for changing the speed of the vehicle, are arranged to be operated by a single handle H, which has a movement of rotation about its own axis to actuate one set of means referred to and another movement of rotation about the axis of its supporting-shaft H' to actuate the other set of means referred to. Provision is also made whereby the movement to effect a change of speed cannot be made until and unless the movement to uncouple the motor and the driving mechanism has been made. As represented in the drawings, reference being had particularly to Figs. 1, 5, 6, 7, and 8, the handle H is rotatably mounted in a sleeve $h$, which is secured to the upper end of the hollow shaft H', mounted in suitable bearings on the body of the vehicle. At the lower end of the shaft H' is secured an arm $H^2$, which is connected by a rod $H^3$ with a rack-bar $H^6$, which is mounted in a suitable guideway secured to the gear-casing $E^2$. If desired, rod $H^3$ may be connected with the rack-bar by intermediate mechanism, (not shown,) such as a lever pivotally secured to a part of the running-gear or frame. A long pinion $H^7$ (see particularly Fig. 2) is also supported in suitable bearings by the gear-casing $E^2$ to engage the rack $H^6$ and the rack-teeth $f'$ of the change-shaft F, whereby the oscillations of the handle H in one direction or the other will cause a corresponding longitudinal movement of the change-shaft F and the engagement of its keys $f$ with one or the other of the driving-gears $F'$ $F^2$ $F^3$. Tubular extensions $e^2$ may be secured to the gear-casing $E^2$ to accommodate the movement of the shaft F and protect it from dust.

Provision is made for preventing accidental movement of the handle H, a notched arc $H^8$ being secured in a fixed position near the upper end of the shaft H' and the handle H being notched or flattened, as at $h^x$. When the handle is turned upon its own axis so that its notch $h^x$ will clear the upper edge of the arc, the handle can be moved to one side or the other; but when the handle is turned upon its own axis to any other position it must engage one or the other of the notches $h^8$ in the arc $H^8$, and so be locked from movement to one side or the other. This rotary movement of the handle upon its own axis is taken advantage of to effect the coupling and uncoupling of the motor and driving mechanism, the movement to release the handle uncoupling the motor and the driving mechanism, so that the driving mechanism is always disconnected from the motor whenever a change of the speed-gears is effected. As represented in the drawings, (see particularly Fig. 7,) the shaft H' above referred to is a hollow shaft or sleeve and receives within it a longitudinally-movable bar I, formed near its upper end with rack-teeth $i$ for engagement by a pinion I', secured to or formed on the rotatable handle H, whereby the rotation of the handle to release it from the arc $H^8$ produces a longitudinal movement of the bar I. The other end of the bar I is connected to a bell-crank $I^2$, which in turn is connected by a rod $I^3$ with the clutch-operating bell-crank $I^4$. (Shown in Fig. 1.)

It will of course be understood that the details of construction and arrangement of the several features of the invention can be varied according to convenience or the requirement of different structures and that the invention is not to be limited to the precise construction and arrangement of parts herein shown and described.

I claim as my invention—

1. In a motor-vehicle, the combination with driving-wheels, a supporting-axle and a motor for driving said wheels, of a change-speed gear and a balance-gear interposed between the motor and driving-wheels, means for setting the change-speed gears for different speeds, a clutch and actuating mechanism therefor, and a continuous casing, entirely enveloping all of the mechanism intermediate the motor-shaft and the axle of the driving-wheels.

2. In a motor-vehicle, the combination with a motor and a driving-shaft, of a driven shaft or member comprising two independently-rotatable parts, a balance-gear connecting said parts, a change-speed gear between the driving-shaft and the balance-gear, and a completely-inclosing casing about the change-speed gear and the balance-gear and encircling the two-part driven shaft.

3. In a motor-vehicle, the combination with a motor and a driving-shaft, of a driven shaft or member comprising two independently-rotatable parts, an interconnecting differential driving-gear, a plurality of trains of gears for changing the speed of said differential driving-gear interposed between the driving-shaft and the driven members, and a completely-inclosing and supporting casing extending from said driving-shaft to the driven member and including said change-speed gear and differential driving-gear and having bearings encircling said driven member.

4. In a motor-vehicle, the combination with a motor, driven wheels, and a supporting-axle for said wheels, of an inclosing casing extending from said motor to the supporting-axle and provided with bearings, a change-speed mechanism including gears mounted in said bearings, an axially-movable shaft arranged within said gears and concentric with their bearings, interengaging parts arranged upon said axially-movable shaft and the gears, whereby either of them may be positively engaged with the shaft, and a clutch controlling the rotation of said shaft.

5. In a motor-vehicle, the combination with driving-wheels, a supporting-axle therefor, a balance-gear supported upon said axle, and a motor, of an inclosing casing extending from the motor to the supporting-axle and enveloping the balance-gear, change-speed gears supported exteriorly of their hubs in bearings in the casing, an axially-movable shaft provided with positive engaging means for engaging either of said gears, a clutch carried by said shaft, means for producing axial movement of the shaft, and means for controlling the clutch.

6. In a motor-vehicle, the combination of a power-shaft, intermediate change-speed mechanism, a casing completely inclosing said mechanism, a longitudinally-movable shaft coöperating with said change-speed mechanism within the casing and projecting through the wall of said casing and an extension on said casing completely inclosing the projecting portion of the longitudinally-movable shaft.

7. In a change-speed mechanism, the combination of a motor-shaft and a driven shaft, a plurality of sets of gears of different transmission ratio, a longitudinally-movable shaft, means for supporting one gear of each of said sets concentrically with said longitudinally-movable shaft, bearings for said gears of greater diameter than the internal bore of said gears, and interengaging means for coupling said longitudinally-movable shaft to any one of said gears.

8. In a change-speed mechanism, the combination of a driven shaft and a plurality of gears of different sizes fixed thereto, a parallel shaft and a plurality of gears complementary to the gears on the first-named shaft supported in bearings and held against lateral movement and constantly in mesh with the first-named gears, a longitudinally-movable shaft or member concentric with said latter gears and adapted for operative engagement therewith, means for rotating said longitudinally-movable member, a circular rack carried with the longitudinally-movable member, and a pinion engaging therewith to shift said longitudinally-movable member into and out of engagement with any of said gears, whereby a change speed may be obtained during the rotation of said shaft.

9. In a change-speed mechanism, the combination of a driving member and a driven member, a casing provided with bearings, a system of gears mounted in said bearings, a member arranged interiorly of said gears and adapted for rotary and axial movements, means for rotating said member, means for shifting said member axially, and interengaging parts between said member and gears.

10. In a motor-vehicle, a change-speed mechanism including a plurality of gears, a shaft within said gears and adapted for engagement therewith said shaft and gears being relatively movable longitudinally of said shaft, a pinion, and a circular rack on the movable part to be engaged by said pinion whereby longitudinal movement may be effected during the rotation of said part.

11. In a motor-vehicle, a change-speed mechanism including a plurality of gears of different sizes, a set of gears to mesh with said different-sized gears, bearings for said gears engaging the hubs of said gears exteriorly, a shaft passing through said gears, and interengaging means between said shaft and the inside of the hub of said gears.

12. In a motor-vehicle, a change-speed mechanism including a plurality of gears of different sizes, corresponding gears meshing therewith, means for supporting said gears exteriorly and an axially-shiftable member provided with interengaging parts and adapted to engage them exteriorly, whereby either of said gears may be clutched to the shaft.

13. In a motor-vehicle, the combination of a motor, a longitudinally-immovable driving-shaft, a longitudinally-immovable driven shaft, connections from the last-named shaft to the driving-wheels of the vehicle, a longitudinally-movable intermediate shaft having circumferential rack-teeth, an actuating-pinion engaging said rack-teeth and speed-changing gears engaging directly with said shafts interposed between the driving-shaft and the driven shaft.

14. In a motor-vehicle, the combination of a motor, a driving-shaft, a driven shaft, an interconnecting change-speed gear, means for shifting said change-speed gear including a longitudinally-movable shaft, a circumferential rack on said longitudinally-movable shaft, and a pinion for operating the same and connections for actuating the pinion from the body of the vehicle.

15. In a motor-vehicle, the combination of a motor and driving mechanism, including driven gears of different sizes, rotatable upon fixed bearings upon a common axis, corresponding driving-gears in mesh with said driven gears respectively, a longitudinally-movable shaft concentric with which said driven gears are mounted, said shaft having a key to engage one or the other of said driven gears, means to shift said shaft longitudinally and means to rotate said shaft.

16. In a motor-vehicle, the combination of a motor and driving mechanism, including driven gears of different sizes rotatable upon fixed bearings upon a common axis, corresponding driving-gears in mesh with said driven gears respectively, a longitudinally-movable shaft concentric with which said driven gears are mounted, said shaft having a key to engage directly with one or the other of said driven gears and having circumferential rack-teeth, a pinion engaging said rack-teeth, means to rotate said pinion, and means to rotate said shaft.

17. In a motor-vehicle, the combination of a motor and driving mechanism, including gears of different sizes rotatable upon fixed bearings upon a common axis, corresponding driving-gears in mesh with said driven gears respectively, a longitudinally-movable shaft concentric with which said driven gears are mounted, said shaft having a key to engage directly with one or the other of said driven gears, means for rotating said shaft including a friction-clutch, and means to shift said shaft longitudinally.

18. In a motor-vehicle, the combination with a motor and driving mechanism comprising change-gears and a clutch, of a single handle having two different movements, independent sets of transmitting devices between said handle and said change-gear and clutch, whereby one movement of the handle actuates the clutch and the other the change-gear, of a locking device to prevent movement of the handle to shift the change-gear operated by the movement of the handle to actuate the clutch.

19. In a motor-vehicle, a controlling-handle having a movement of rotation about its own axis and secured to a vertical shaft rotatable on an axis transverse to the axis of the handle, independent sets of transmitting devices separately operated by said movements respectively, and means to prevent simultaneous rotation of said shaft and handle.

20. In a motor-vehicle, the combination with a motor and driving mechanism, of a controlling-handle having a movement of rotation about its own axis, connected to a vertical shaft rotatable on an axis transverse to the axis of the handle, independent sets of transmitting devices separately operated by said movements respectively and means to prevent simultaneous rotation of said shaft and handle.

21. In a motor-vehicle, the combination with a motor and driving mechanism comprising change-gears and a clutch, of a handle having a movement of rotation about its own axis connected to a vertical shaft rotatable on an axis transverse to the axis of the handle, of independent sets of transmitting devices between said handle and said change-gear and clutch, one set of said devices being actuated by the rotation of the handle about its own axis and the other by the rotation of the shaft.

22. In a motor-vehicle, the combination with a motor and driving mechanism comprising change-gears and a clutch, of a hollow shaft, a handle connected thereto to swing about the axis of the shaft and rotatable on its own axis, a bar movable longitudinally within said hollow shaft and operatively connected with said handle to be shifted longitudinally as the handle is rotated upon its own axis, and connections between said shaft and bar and said change-gears and clutch respectively.

23. In a motor-vehicle, the combination with a motor and driving mechanism comprising change-gears and a clutch, of a hollow shaft, a handle connected thereto to swing about the axis of the shaft and rotatable on its own axis, a bar movable longitudinally within said hollow shaft and having a rack to engage a pinion on the handle, and connections between said shaft and bar and said change-gears and clutch respectively.

24. In a motor-vehicle, the combination with a motor and driving mechanism comprising change-gears and a clutch, of a hollow shaft, a handle connected thereto to swing about the axis of the shaft and rotatable on its own axis, a bar movable longitudinally within said hollow shaft and operatively connected with said handle to be shifted longitudinally as the handle is rotated upon its own axis, a notched arc fixed near said handle, said handle being notched or flattened to clear the arc or to turn into one of its notches, and connections between said shaft and bar and said change-gears and clutch respectively.

25. In a motor-vehicle, controlling mechanism comprising a controlling-handle mounted upon a pillar and having a swinging movement and a rotary movement, and separate connections severally actuated by the handle in its respective movements.

26. In a motor-vehicle, controlling mechanism comprising a controlling-handle mounted upon a pillar and having a swinging movement and a rotary movement, a change-speed mechanism, a clutch mechanism and separate connections intermediate of the controlling-handle and said mechanisms.

27. In a motor-vehicle, controlling mechanism including a controlling-handle supported on a pillar and adapted for two individual movements in a single plane, a change-gear mechanism and a clutch adapted respectively to be controlled by the movements of said handle, and means for positively locking said handle in a predetermined position with respect to one of its movements while it is moved through the other.

28. Controlling mechanism including a controlling-handle operatively mounted on a pillar and adapted for swinging and rotary movements, a change-speed mechanism and a clutch mechanism, and concentric connections intermediate said mechanisms and the controlling-handle adapted for rotary and reciprocating movements with relation to each other whereby the change-speed mechanism and clutch mechanism are actuated only in a predetermined manner.

29. In a motor-vehicle, controlling mechanism including a controller-handle having different movements, means whereby said controller-handle is locked against one movement when free for another movement, and separate connections severally actuated by the handle in its respective movements.

30. In a motor-vehicle, the combination of a running-gear including a driven axle, a motor and transmitting devices operatively mounted upon said running-gear adapted to drive said axle, a vehicle-body spring-supported with relation to said running-gear and its supported parts, a controlling mechanism for controlling the transmitting devices embodying a part secured to the body and flexible connections between the portions of the controlling mechanism carried upon the body and upon the running-gear.

31. In a motor-vehicle, the combination of a running-gear frame including an axle, a motor supported in fixed relation therewith, a clutch and change-speed mechanism, means for actuating said change-speed mechanism and clutch, a body portion, controlling means on said body portion to effect change of speed and operate the clutch mechanism and flexible means between said body and said running-gear to connect said controlling means on the body with the actuating means on the running-gear.

This specification signed and witnessed this 11th day of October, A. D. 1899.

HARRY M. POPE.

In presence of—
MAY RICHMOND,
HERMANN F. CUNTZ.